United States Patent [19]

Andersson et al.

[11] Patent Number: 4,834,597
[45] Date of Patent: May 30, 1989

[54] TOOL ASSEMBLY, TOOL COMPONENTS AND METHOD OF ASSEMBLYING SAID COMPONENTS

[75] Inventors: Ken G. E. Andersson, rsunda; Sven E. O. Engstrand, Sandviken; Lars G. sberg, Järbo, all of Sweden

[73] Assignee: Sandvik Aktiebolag, Sandviken, Sweden

[21] Appl. No.: 181,379

[22] Filed: Apr. 14, 1988

[30] Foreign Application Priority Data

Apr. 21, 1987 [SE] Sweden .................. 8701621

[51] Int. Cl.⁴ ................... B23C 5/26; B23B 29/00
[52] U.S. Cl. ........................ 409/234; 82/160; 279/103; 408/239 A
[58] Field of Search ............ 409/234, 232, 233; 408/239 R, 239 A, 238; 279/102, 103, 8, 1 A; 82/36 A, 36 B, 36 R

[56] References Cited

U.S. PATENT DOCUMENTS

| 611,494 | 9/1898 | Leonard | 279/103 |
|---|---|---|---|
| 926,845 | 7/1909 | Bradley | 279/103 |
| 994,154 | 6/1911 | Hackett | 279/103 |
| 1,052,309 | 2/1913 | Boone | 279/103 |
| 2,167,014 | 7/1939 | Verderber | 279/103 |
| 3,082,014 | 3/1963 | Wohlhaupter et al. | 279/103 |
| 3,554,080 | 1/1971 | Herrmann | 409/234 |
| 4,621,960 | 11/1986 | Töllner | 409/232 |
| 4,684,301 | 8/1987 | Elkle | 409/234 |
| 4,725,173 | 2/1988 | Hoffman et al. | 409/234 |
| 4,748,879 | 6/1988 | von Haas | 409/234 X |

FOREIGN PATENT DOCUMENTS

| 731859 | 4/1966 | Canada | 409/234 |
|---|---|---|---|
| 680914 | 9/1939 | Fed. Rep. of Germany | 279/102 |
| 705419 | 6/1931 | France | 279/102 |
| 1234605 | 10/1960 | France | 279/103 |
| 390877 | 1/1974 | U.S.S.R. | 409/234 |
| 403514 | 3/1974 | U.S.S.R. | 409/232 |
| 1113218 | 9/1984 | U.S.S.R. | 409/234 |
| 552606 | 4/1943 | United Kingdom | 279/8 |
| 1518295 | 7/1978 | United Kingdom | 409/234 |

*Primary Examiner*—William Briggs
*Attorney, Agent, or Firm*—Burns, Doane, Swecker & Mathis

[57] ABSTRACT

The invention relates to a tool assembly and a method of assembling the tool. The assembly comprises a machine spindle component and a tool component for chip removal. The spindle component comprises a central clamp and a central recess. The tool component has a central projection and a central threaded bore in its axially rear end. The seat and the projection comprise complementary, non-circular surfaces which are brought against each other during tightening of the clamp. The tightening of the clamp is terminated by the mutual abutment of a front surface of the spindle and an end surface of the tool. The cooperating non-circular surfaces receive moment forces arising during the use of the tool.

13 Claims, 7 Drawing Sheets

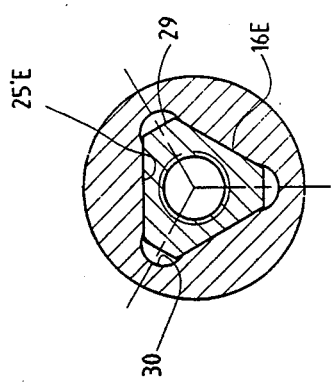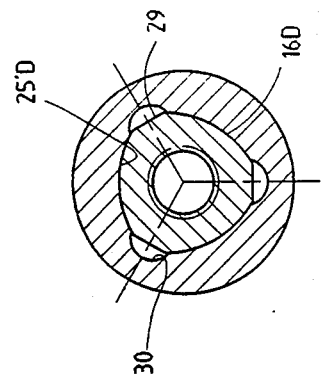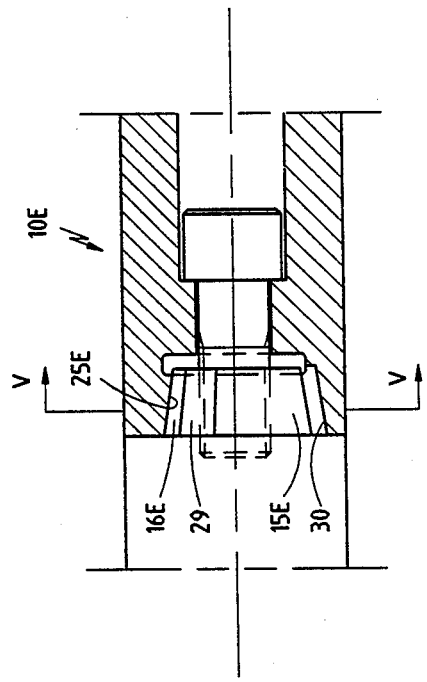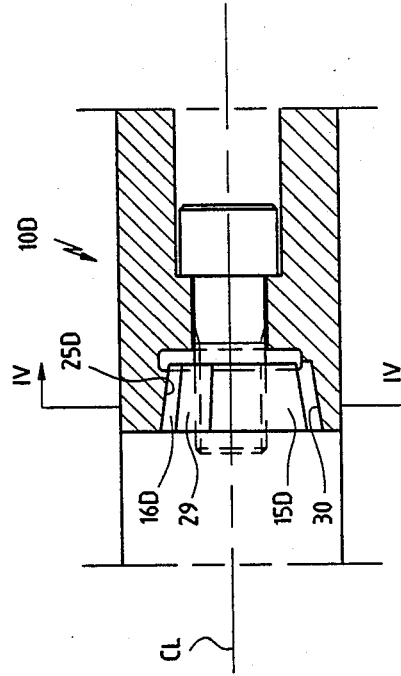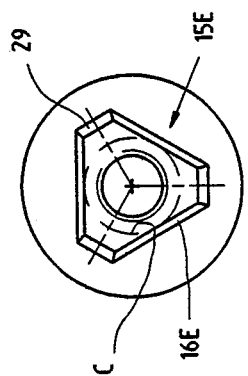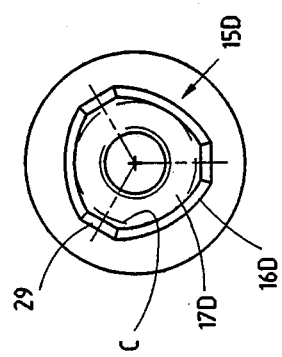

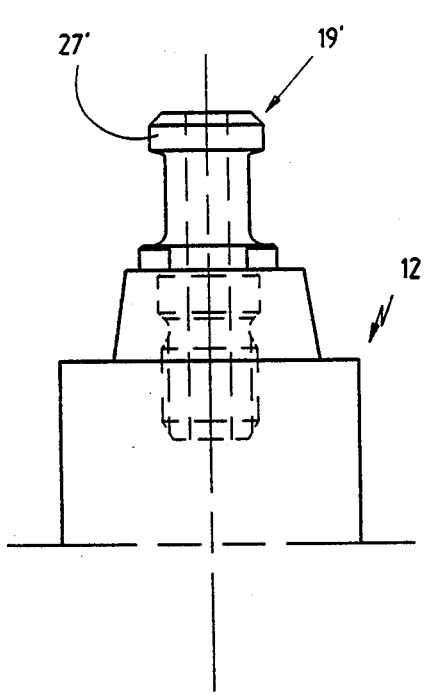
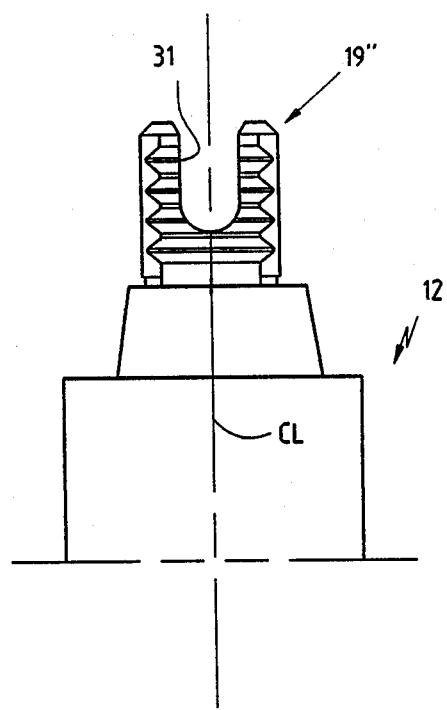
FIG. 7B
FIG. 8B
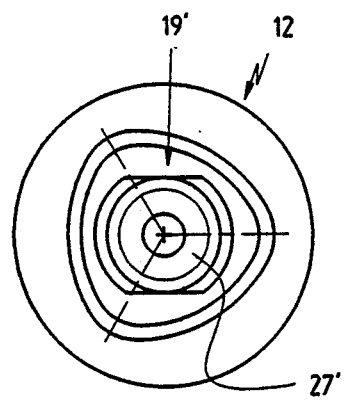
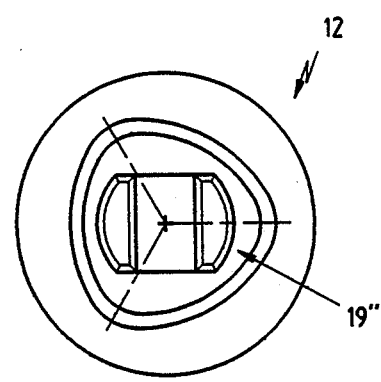
FIG. 7A
FIG. 8A

TOOL ASSEMBLY, TOOL COMPONENTS AND METHOD OF ASSEMBLYING SAID COMPONENTS

BACKGROUND OF THE INVENTION

The present invention relates to a tool assembly, tool components and a method of assemblying said components. The assembly comprises a tool or an adapter for a tool and a holder. The tool or the adapter as well as the holder are provided with either a conical projection or a conical recess cooperating with each other and a first support surface or a second support surface cooperating with each other. The assembly, which has a center axis, further comprises means for clamping said tool or said adapter to said holder.

A known assembly of the above-mentioned type discloses conical connecting surfaces of the holder and the tool. The tool is driven in the rotational direction of the assembly by means of wedges which cooperate with grooves in the holder. The wedges and the grooves are completely exposed to debris and chips which bring problems at clamping and cause stability problems. Furthermore the assembly is relatively complicated to produce, i.e. the manufacture of the necessitates a plurality of machining operations. Furthermore the use of the wedges and the grooves reduce the support surface between the tool and the holder.

An object of the present invention is to provide a tool assembly which is unsensitive to debris and chips.

Another object of the present invention is to arrange a tool assembly such that it consists of a few elements and therefore being simple to produce.

Still another object of the present invention is to create a stable and secure clamping of the tool.

These and other objects have been obtained through the features and characteristics of the appended claims.

THE DRAWINGS

The invention will be more clearly described hereinafter in connection with the appended drawings wherein:

FIGS. 1A, 2A, 3A, 4A, 5A, 6A and 10A show different embodiments of tools which are components of the assembly, in end views.

FIGS. 1B, 2B, 3B, 4B, 5B, 6B, and 10B show side views of different embodiments of the assembly, partly in section, in which respective tools according to FIGS. 1A to 6A and 10A form parts.

FIGS. 1C, 2C, 3C, 4C, 5C, 6C and 10C show cross-sections of the different embodiments of the assembly along lines I—I, II—II, III—III, IV—IV, V—V, VI—VI and X—X respectively.

FIGS. 7A, 7B, 8A, 8B and 9A, 9B show additional embodiments of the tool in end views and side views.

DESCRIPTION OF PREFERRED EMBODIMENTS OF THE INVENTION

Figure 1C:
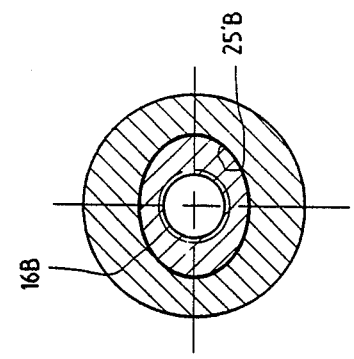
Figure 1B:
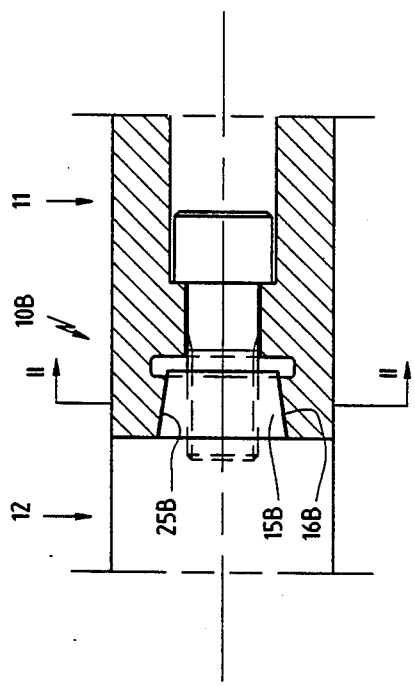
Figure 1A:
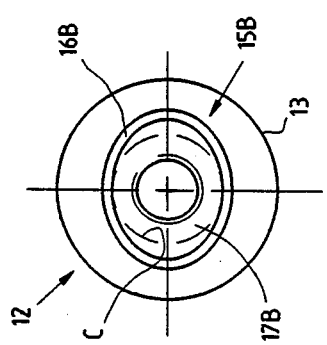

In FIGS. 1A, 1B, and 1C is shown an embodiment of a tool assembly 10A according to the invention comprising a machine spindle or holder 11, a tool 12 for chip removal or an adapter for a tool (not shown) and clamping means 19. The tool can be of stationary or rotary type, i.e. a milling cutter, a drill, a lathe tool or the like. The assembly or coupling has a cylindrical shape and a center line CL.

The tool 12 has a generally cylindrical envelope surface 13, an axially forward end portion (not shown) provided with a cutting edge and an axially rearward end portion provided with a planar support surface 14 from which a tap or projection 15A projects having the shape of a truncated cone. The end surface 14 lies in a plane which is normal or perpendicular to the center line CL and extends circumferentially 360 degrees around the center line. The tap 15A has a conical envelope surface 16 which has a non-circular or non-round cross-section taken normal to the center line. The cross-section in this embodiment of the tool has a three sided, generally epitrochoidal profile having three convex lobes, i.e. the distance between two parallel tangents of the envelope surface 16A in a given cross-section is always constant. Thus the three sided epitrochoid will be self-centered in engagement with a recess having a corresponding three sided, generally epitrochoidal profile. The distance $d_1$ between two parallel tangents of the envelope surface in a given cross-section, here in the end surface 17A of the tap 15A, is always larger than the diameter D of an inscribed circle C in said cross-section. The circle C can be representative of said to be one end of a circular conical attachment part of a known tool and the three parts of the tap 15A which extend radially beyond that inscribed cone can be said to constitute drivers or means for driving. The peak regions of the drivers are arranged around the circle with a graduation or spacing of 120 degrees. The relation between the average diameter of the tap 15A and the projection of the tap from the end surface 14 is about 2:1 or, more generally, lies in the range from 1:1 to 5:1. The cone gradient of the tap lies in the range from 1:2 to 1:20, preferably from 1:4 to 1:10. A central threaded bore 24 is provided at the rear end of the tool.

The machine spindle or holder 11 comprises a cylindrical housing 18 and a clamping mean 19. The housing 18 has a central, longitudinal first bore 20 which connects axially forwardly to a second bore 21 via an annular shoulder 22. The second bore 21 has a smaller diameter than the first bore 20. The second bore 21 also connects to an annular groove 23 whose diameter is larger than the diameter of the second bore. The groove 23 is provided to reduce the bending resistance at the forward end of the spindle around a conical recess 25A or a conical seat and to provide for clearance during production of the seat 25 A. The seat extends from a generally planar front surface 26 of the spindle and terminates at the groove 23. The front surface 26 lies in a plane which is perpendicular to the center line CL and extends circumferentially 360 degrees around the center line. The wall 25'A defining the recess 25A and the envelope surface !6A of the tap 15 are identical in cross-sectional shape except that the average diameter of the recess is somewhat smaller, about 5 to 100 μm, than the average diameter of the tap. This means in other words that in a given cross-section taken at the distance x from the reference plane which is defined by the end surface 14, the envelope surface 16A of the tap has, in an unassembled state, a somewhat larger diameter at the inscribed circle as compared to the inscribed circle which is defined by the wall 25'A of the recess 25A when the cross-section is taken at the same distance x from the plane of the front surface 26. The cone gradient of the wall 25'A is generally identical with the gradient of the surface 16A; by "generally identical" is meant that a difference within normal tolerances may be present. A bolt 19, which threadedly engages the bore 24 of the tool and whose head 27 abuts against the shoulder 22, pulls, at tightening, the tap 15A into the seat 25A such that the complementary surfaces 16A and 25'A fit into each other. The assemblying of the spindle and the tool thus gives a grip fit interaction that is free of play and centered and comprises drivers that are integral with the surface 16A and the wall 25'A.

At the dismounting of the tool from the spindle said process is reversed whereby the means 19—in axially fixed position —is rotated in opposite direction. The axial position of the bolt 19 can be fixed by a lock washer applied axially rear of the head of the bolt. The wall 25'A of the seat 25A will shrink to its original dimension as the projection is removed therefrom, whereafter it is ready to receive a new tool or adapter.

The clamping means 19 in the form of a bolt may alternatively be replaced by conventional clamping means, examples of which are shown in FIGS. 7A and 7B; 8A and 8B; and 9A, 9B and 9C.

Alternatively the projection 15A may be provided on the spindle and the seat 25A in the tool. The clamping means 19 may alternatively be provided in the tool 12 for engagement withe a threaded bore in the holder 11.

Figure 2C:
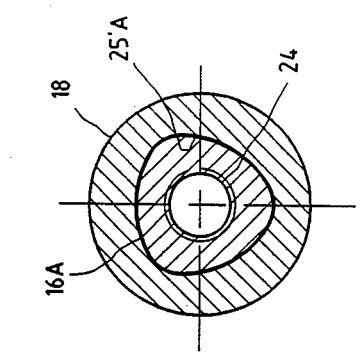
Figure 2B:
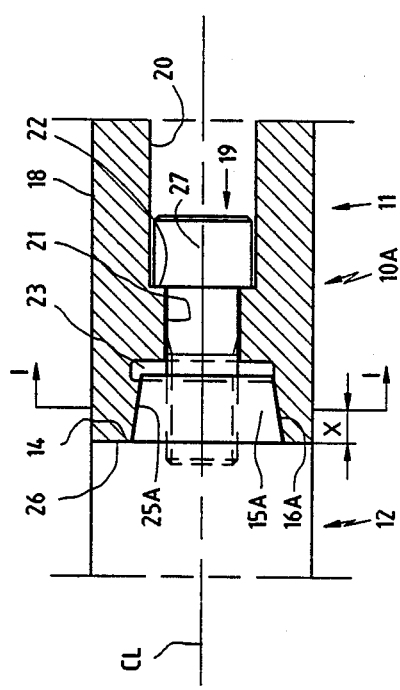
Figure 2A:
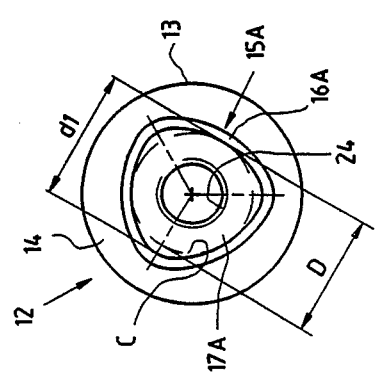

In FIGS. 2A, 2B, and 2C an alternative embodiment is shown of an assembly 10B according to the invention. Beside the envelope surface 16B and the end surface 17B of the tap 15B and the wall of the seat, the assembly is identical with the one described above. The following text will be concentrated mainly on the differences thembetween.

The tap 15B has a conical envelope surface 16B which has a non-circular cross-section. The cross-section in this embodiment has an elliptic or oval shape. The major axis of the ellipse is preferably arranged parallel with the x-x-z-plane of the machine (not shown), i.e. the plane that is defined by radial and axial feed at turning. In FIG. 2A a circle C has been inscribed in the end surface 17B of the tap 15B. In that plane which is defined by the end surface, as in all cross-sections parallel therewith, the bordering line of the end surface follows a path that differs in radial direction from the circle except at two points along the minor axis of the ellipse. In this case there are two drivers arranged radially beyond the circle C, whose peaks are arranged with a graduation of 180 degrees or are circumferentially spaced by 180 degrees.

The seat 25B in the machine spindle has a complementary elliptical wall 25'B. The wall of the seat is conical and its bordering line in a cross-section describes a path, in unassembled state, whose dimension is somewhat less than the dimension of the tap 15B in corresponding cross-section.

Figure 3C:
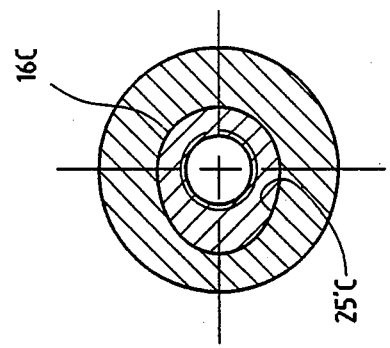
Figure 3B:
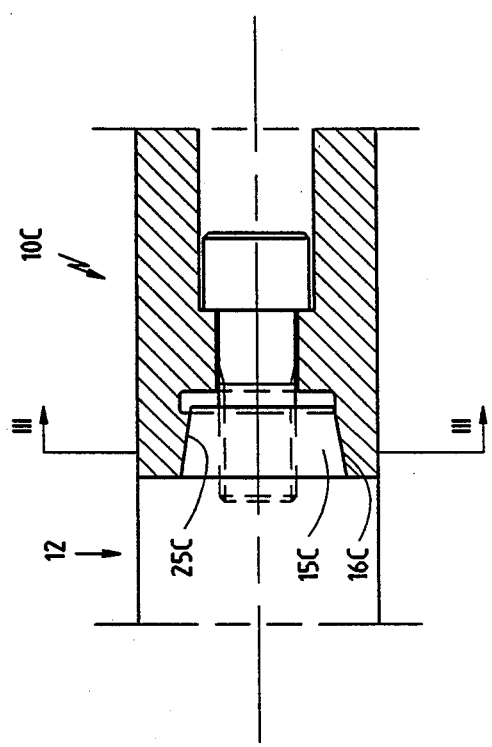
Figure 3A:
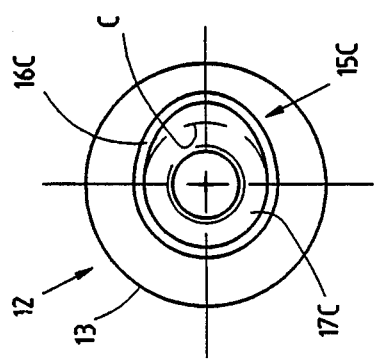

FIGS. 3A, 3B, and 3C show still another embodiment of a tool assembly 10C according to the invention. Beside the envelope surface 16C and the end surface 17C of the tap 15C and the wall 25'C of the seat 25C the assembly is identical with the one described in connection with FIGS. 2A, 2B, and 2C and therefore mainly the differences thembetween are described hereinafter.

The tap 15C has a conical envelope surface 16C which has a non-circular cross-section. The ross-section in this embodiment is a combination of a semi-elliptic and a semi-circular shape. In FIG. 3A a circle C has been inscribed in the end surface 17C of the tap 15C. In the plane of the end surface as in all cross-sections parallel thereto the bordering line of the end surface 17C follows a path which under about 180 degrees coincides with the circle C while the rest of said borderline follows an elliptical path radially beyond the circle. Thus only one driver is formed in this embodiment and therefore the assembly cannot be assembled in more than one way.

The seat 25C has a complementary semi-elliptical and semi-circular shape. The wall 25'C of the seat 25C is conical.

The assemblying of the assembly is as described above.

FIGS. 4A, 4B, and 4C show still another embodiment of a assembly 10D according to the invention. The assembly 10D is identical with the assembly 10A except that the envelope surface 16D of the tap 15D and the wall 25'D of the seat 25D comprise longitudinally extending radially retracted portions or longitudinally extending planar bevels 29 and longitudinal grooves 30, respectively. The bevels 29 and the grooves 30 are provided, respectively, at regularly spaced intervals, e.g., 120 degree intervals, around the center line CL. The bevels and the grooves are provided at envelope surface and the wall, respectively, where they are radially farthest beyond the inscribed circle. Each bevel and groove encloses a distance in the circumferential direction of the tap 15D or the seat 25D which is defined by approximately 20 to 30 degrees. The bevels and the grooves are primarily provided as clearances at the production of the assembly.

Still another embodiment of an assembly 10E according to the invention is shown in FIGS. 5A, 5B, and 5C. The assembly 10E is identical with the assembly 10D except that the bevels 29 and the grooves 30 are connected by straight portions 16E. Thus the tap 15 is a truncated pyramid wherein the cross-section is a regular triangle having chamfered corners. The wall 25'E of the seat 25E in a cross-section forms a regular triangle with widened corners at the grooves 30.

Figure 6C:
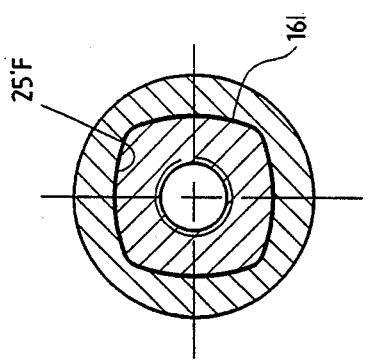
Figure 6B:
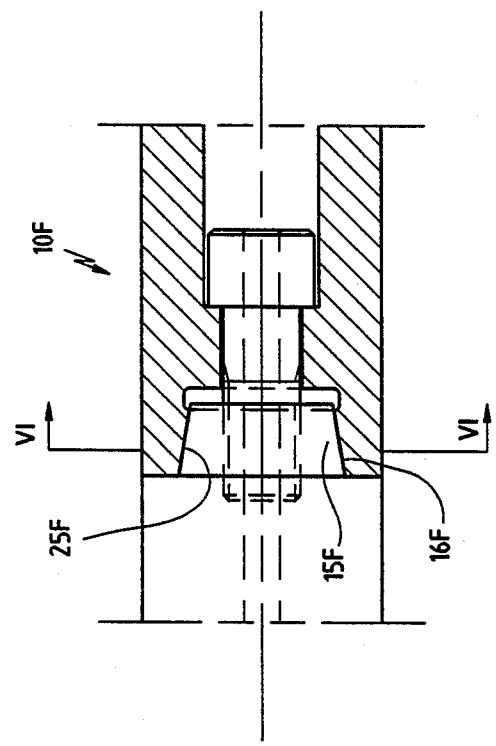
Figure 6A:
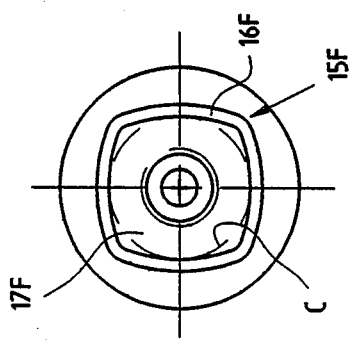

Still another embodiment of an assembly 10F according to the invention is shown in FIGS. 6A, 6B and 6C. Beside the envelope surface 16F and the end surface 17F of the tap 15F and the wall 25'F of the seat 25F the assembly is identical with the one described in connection with FIGS. 1A, 1B and 1C and therefore mainly the differencies thembetween are described hereinafter.

The tap 15F has a conical envelope surface 16F which has a cross-section and an end surface 17F of a four sided epitrochoid having four convexe lobes. In FIG. 6A a circle C has been inscribed and the graduation of the drivers extending radially beyond said circle is regular, i.e. the graduation of the driver peaks is about 90 degrees.

The wall 25'F of the seat 25F has a complementary epitrochoidal shape.

The method of assemblying the tool components described above comprising a tool or an adapter in a holder comprises the steps of: providing the tool or the adapter and the holder with male 12 and female 11 parts so that a conical projection 15A–15F of the male part having a non-circular cross-section mates with a recess 25A–25F of the female part; providing means 19;19';19" and 19''' for forcing the tool or the adapter towards the holder; inserting said conical projection in said recess until said projection abuts said recess such that a play about 0.05 mm is created between the surfaces 14 and 16; forcing said projection further into said recess thereby expanding said female part less than 50 μm until support surfaces 14 and 16 of the male and female parts stop further insertion so as to rigidly hold the tool or the adapter to the holder during machining operations.

FIGS. 7A and 7B show a tool 12 provided with an alternative clamping means 19' of conventional type provided to cooperate with a draw bar, not shown. The axially forward end of the draw bar comprises claw-like means which are arranged to grasp around and pull the head 27' of the means 19' axially rearwards.

FIGS. 8A and 8B show a tool 12 provided with still another alternative clamping means 19" which is more closely described in Hoffman et al. U.S. Pat. No. 4,725,173 which is incorporated herein by reference. The means 19" is provided to cooperate with two cylindrical halves, not shown. The cylindrical halves are pulled together in a direction perpendicular to the center line CL by means of a screw that runs through a slot 31. The halves and the means comprise cooperating serrations which force the tool axially inwardly into the spindle.

Figure 9C:
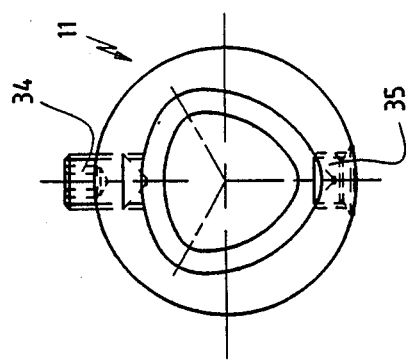
FIG. 9C shows a embodiment of a holder in an end view.
Figure 9B:
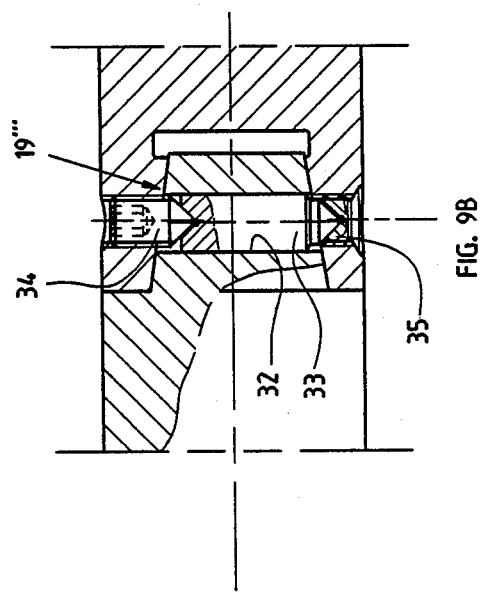
Figure 9A:
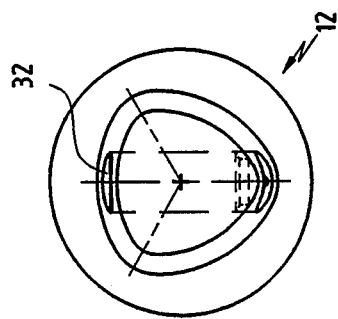
Figure 10C:
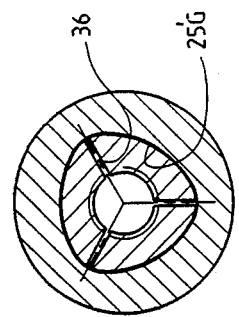
Figure 10D:
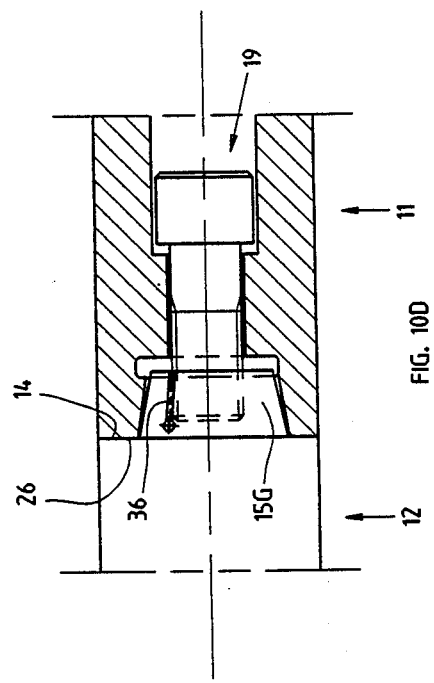
FIGS. 10D and 10E show an embodiment of the assembly, partly in section, and an embodiment of a tool, in a side view, respectively.
Figure 10B:
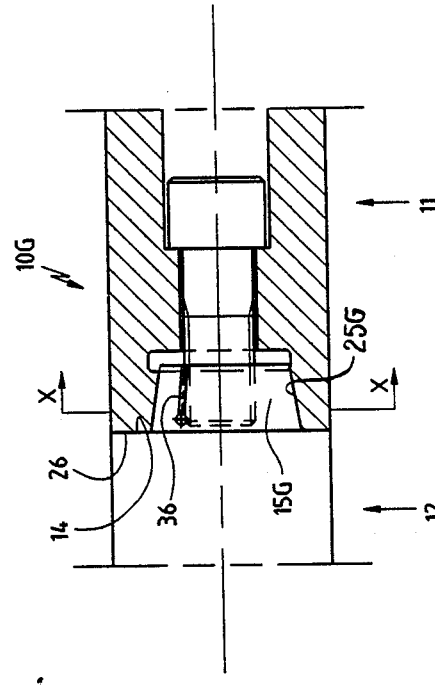
Figure 10E:
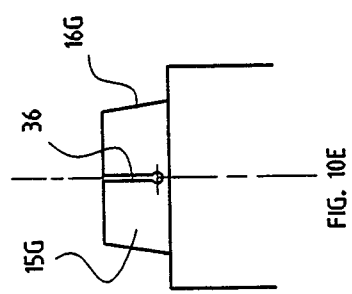
Figure 10A:
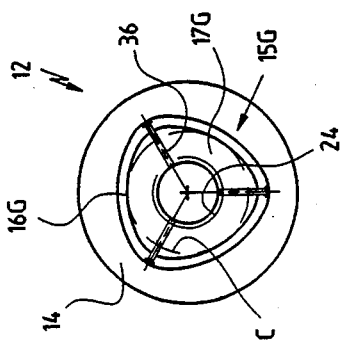

FIGS. 9A, 9B and 9C show still another alternative clamping means 19'''. The projection of the tool 12 is provided with a transverse bore 32 at a certain distance from its support surface in order to receive a cylindrical rod 33 having a conically convex end and a conically concave end. The holder 11 is provided with a transverse threaded bore which intersects the seat of the holder at a certain distance from its front surface. The first-mentioned distance is somewhat shorter than the latter distance. Two radially movable screws 34 and 35 engage the threaded bore, whereof one 34 has a conically convex, radially inner end and the other 35 has a conically concave, radially inner end. The tap of the tool 12 or adapter is inserted into the seat of the holder 11 and the screw 34 is screwn radially inwardly so to push the rod 33 towards engagement with the other screw 35. The tool or adapter will thus move axially rearwardly due to camming engagements of the screws and the rod. The abutment of the support surface of the tool or adapter and the front surface of the holder terminates the tool movement.

FIGS. 10A, 10B, 10C, 10D and 10E show still another embodiment of an assembly 10G according to the present invention. The assembly 10G is identical with the assembly 10A except that the projection 15G of the tool 12 or adapter is provided with three equi-angularly spaced slots 36. Each slot 36 extends in the longitudinal direction of the projection from the end surface 17G of the projection and terminates short of the support surface 14. Each slot 36 extends radially from the envelope surface 16G to the threaded bore 24. The slots 36 are provided to reduce the bending resistance of the projection 15G.

The slots are circumferentially spaced approximately 120 degrees. When assemblying the assembly 10G the projection 15G of the tool 12 or adapter is inserted into the seat 25G until the support surface 14 abuts against the front surface 26. The cone angle of the projection is about a few seconds larger than the cone angle of the seat (FIG. 10D) although they have mainly the same base dimensions and thus said insertion will not be stopped by interaction of the projection and the seat. The bolt 19 is then threaded into the bore 24 at some optional stage so as to pull the surfaces 14 and 26 together. The flanks of the threads of the bolt and the bore will spread the projection apart to fill the small gap caused by said different cone angles. Thus the tool or adapter will be rigidly secured in the holder.

More specifically the method of assemblying these tool components comprising a tool or an adapter for a tool and a holder comprises the steps of:

providing the tool or adapter and the holder with male 12 and female parts 11 so that a slotted conical projection 15G of the male part makes the projection expansible within a conical recess 25G in the female part;

providing the projection and the recess with non-circular cross-sections so that there is a radial dimensional difference thembetween in at least one cross-section normal to a center axis CL of the assembly;

providing means for expanding the projection: inserting the projection into the recess until support surfaces 14 and 16 of the male and female parts stop further insertion;

expanding the envelope or outer peripheral surface of the projection so that it contacts the inner wall 25'G of the recess;

providing enough friction force between the envelope surface and the wall so as to hold the male part rigidly in the female part during machining operations.

It should be understood that various combinations of the different embodiments referred to above can be made. For example the provision and the number of slots in the projection is not dependent upon the cross-section of the projection. There should be at least one slot in the projection. Furthermore, the clamping means may be generally used regardless of the cross-section of the projection and the seat.

We claim:

1. Tool assembly comprising a first part and a second part, one of said parts comprising a toll or an adapter for a tool and the other of said parts comprising a holder, said first part having a truncated conical projection and a first support surface facing the second part, said second part comprising a conical recess in order to receive said projection and a second support surface for abutment against said first support surface, said assembly further comprising means for relative clamping of said first part against said second part, said assembly having a center line, characterized in that the projection and the seat comprise cooperating surfaces which are non-circular in cross-section and in that the projection or the recess is expansible.

2. Tool assembly according to claim 1, characterized in that the cross-sectional dimension of the projection, for a given cross-section, in an unassembled state is different from the cross-sectional dimension of the recess, in a corresponding cross-section, in an unassembled state.

3. Tool assembly according to claim 2, characterized in that the projection and the seat have generally identical cone gradients.

4. Tool assembly according to claim 1, characterized in that the envelope surface of the conical projection in cross-section has at least one element which extends radially beyond a circle inscribed within the cross-section, said element being integral with the envelope surface of the projection.

5. Tool assembly according to claim 3, characterized in that the cone gradient lies in the range from 1:2 to 1:20.

6. Tool assembly according to claim 1, characterized in that the second part has a central first bore coaxial with the center line of the assembly in which an axially rear end of said means extends and in that an axially forward end of said means engage the first part.

7. Tool assembly according to claim 4, characterized in that the projection and the seat in a cross-section normal to the center line has a three- or four-sided epitrochoidal profile, an elliptical profile, a triangular profile or a combination of a semi-elliptic and a semi-circular profile.

8. Tool assembly according to claim 6, characterized in that the projection has a three-or four-sided epitrochoidal profile or a triangular profile and comprises bevelled longitudinal portions in the corner regions of the profile which are facing corresponding longitudinal grooves in the wall of the recess.

9. Tool assembly according to claim 2, characterized in that the dimension of the envelope surface of the projection in a certain cross-section is 5 to 100 micrometer larger than the wall of the recess in the same cross-section in an unassembled state.

10. Tool assembly according to claim 4, characterized in that the projection is provided with at least one slot which extends radially from the envelope surface to a central threaded bore of the projection and which extends longitudinally from a rear end of the projection and terminates short of a support surface of the component.

11. The method of assembling tool components comprising a tool or an adapter and a holder comprises the steps of:
   providing the tool or the adapter and the holder with a support surfaces and male and female components so that a conical projection of the male component having a non-circular cross-section mates with a recess of the female component;
   providing means for forcing the tool or the adapter towards the holder;
   inserting said conical projection in said recess until said projection abuts said recess; and
   forcing said projection further into said recess thereby expanding said female component until said support surfaces of the male and female components stop further insertion so as to rigidly hold the tool or the adapter to the holder during machining operations.

12. Tool assembly according to claim 5, wherein the cone gradient lies in the range from 1:4 to 1:10.

13. Tool assembly according to claim 1, wherein the cooperating surfaces extend substantially to the respective support surfaces.

* * * * *